(12) United States Patent
Gorder

(10) Patent No.: US 6,170,478 B1
(45) Date of Patent: Jan. 9, 2001

(54) PROCESS AND APPARATUS FOR CUTTING A CHAMFER IN CONCRETE

(76) Inventor: Richard S. Gorder, 325 No. Basque, Fullerton, CA (US) 92833

(*) Notice: Under 35 U.S.C. 154(b), the term of this patent shall be extended for 0 days.

(21) Appl. No.: 09/173,378

(22) Filed: Oct. 15, 1998

(51) Int. Cl.[7] ........................................ B28D 1/02
(52) U.S. Cl. ........................... 125/12; 125/16.03; 125/1; 125/38; 83/34; 83/39; 83/49
(58) Field of Search .................. 125/12, 16.03, 125/16.04, 1, 38; 83/34, 39, 49

(56) References Cited

U.S. PATENT DOCUMENTS 4,962,967 * 10/1990 Hinkle .
5,645,040 * 7/1997 Bieri Jun. .
5,724,956 * 3/1998 Ketterhagen .

\* cited by examiner

*Primary Examiner*—Timothy V. Eley
*Assistant Examiner*—Willie Berry, Jr.
(74) *Attorney, Agent, or Firm*—Edgar W. Averill, Jr.

(57) ABSTRACT

A concrete cutting saw and the process of using the concrete cutting saw for making a 45° chamfer cut at an edge of a 90° cut through a concrete wall. The process includes the steps of cutting a 90° cut through a concrete wall with a 90° saw mounted on a trolley riding along a track affixed to the concrete adjacent the cut. The 90° blade is lifted so that it is above the wall surface and a chamfer saw assembly is affixed to the frame. Next, the chamfer saw motor is started and the saw is lowered into a cutting position and the trolley is once again moved along the track, thereby forming a 45° chamfer along the edge of the cut. The apparatus utilizes a chamfer saw frame affixed to the trolley frame after the 90° saw blade has been lifted. The chamfer saw frame is mounted so that it is directly in the position which the 90° saw occupies when the 90° saw blade 16 is in a cutting position.

2 Claims, 4 Drawing Sheets

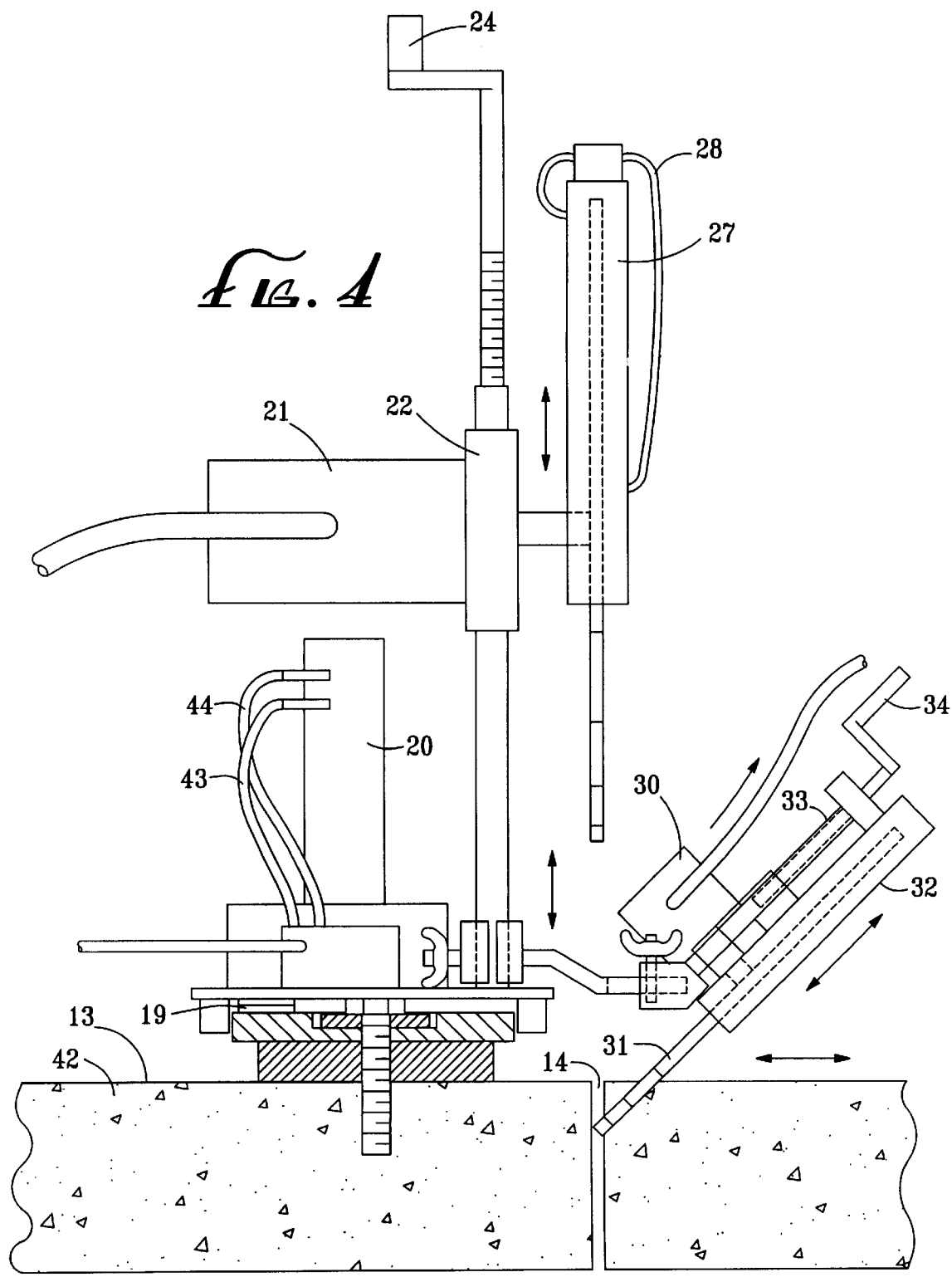

PROCESS AND APPARATUS FOR CUTTING A CHAMFER IN CONCRETE

BACKGROUND OF THE INVENTION

The field of the invention is concrete cutting and the invention relates more particularly to the cutting of a chamfer adjacent a 90° cut made through a reinforced concrete wall. Such 90° cuts are typically made by utilizing a wall saw mounted on a trolley. The trolley rides along a track which typically includes a rack and the trolley typically includes a gear which meshes with the rack and moves the saw slowly along the wall forming a 90° cut. One such saw assembly is shown in U.S. Pat. No. 3,763,845. Another concrete cutting saw referred to as a "wall saw" is shown in U.S. Pat. No. 5,588,418.

Stonecutting saws have been known for many years and a stonecutting saw which includes two separate saw blades is shown in U.S. Pat. No. 896,702. A stonecutting saw, including a 45° saw, is shown in U.S. Pat. No. 2,187,299. These two saws work simultaneously and the monument is mounted in such a way that the saw must travel past the end of the monument before the second saw finishes its cut.

Typically, the prior art has been concerned with the forming of the 90° cut through the wall. After a 90° cut has been made, it is architecturally important that the new opening have the same edges, or edges which are aesthetically related to the edges which are already formed in other openings in the concrete wall. It is well known that in order to form an opening in a concrete tip-up wall, it is beneficial to chamfer the opening so that when the wall is removed from the form from which it is cast, there is no cracking or removal of concrete at the opening. The chamfer solves this problem. However, the concrete wall-cutting saws leave a sharp 90° cut. Typically, a chamfer is formed by grinding along the sharp edge. Such grinding is time consuming, messy and provides a cut which is not a perfect 45° angle. Another approach is to use a Skillsaw type of saw, hand held, and the blade is tilted at a 45° angle. Once again, the cut is not perfectly straight because of the hand held nature of the saw and it is also a slow time consuming and messy process.

BRIEF SUMMARY OF THE INVENTION

It is an object of the present invention to provide a process and apparatus for forming a smooth 45° cut in a concrete wall into which a 90° cut has already been made.

The present invention is for a process for cutting a chamfer along an edge of a cut formed at 90° from a concrete wall surface using a wall saw assembly. The wall saw assembly is of the type which has a track affixed to the concrete wall surface to be cut. The track guides a trolley which supports a saw frame which holds a concrete saw motor and a 90° blade. The saw frame also holds a driven gear which meshes with a rack held by the track to move the trolley along the track in a slow desired speed. First, the 90° cut is formed. Next, the 90° blade is lifted so it is above the wall surface. Next, a chamfer saw assembly is affixed to the frame between the 90° blade and the wall. The chamfer saw assembly includes a chamfer frame, a chamfer saw motor and a chamfer saw blade positioned at a 45° angle with respect to the 90° blade. The chamfer saw blade is positioned above the outer surface of the wall. Next, the chamfer saw motor is turned on to rotate the chamfer saw blade which is then moved into the concrete to form a 45° cut. Next, the trolley is slowly moved along its former path and the chamfer is neatly and accurately formed along the edge of the previously cut 90° kerf.

The apparatus of the present invention includes a trolley riding a track attached to a concrete wall. A trolley frame supports a motor which is adjustably moveable with respect to the trolley frame, which motor supports a 90° saw blade lifted from a cutting position to a lifted position. When the 90° saw blade is in cutting position, it cuts a 90° kerf in a concrete wall. A chamfer saw frame is affixed to the trolley frame after the 90° saw blade has been lifted. The chamfer saw motor is mounted at a 45° angle with respect to the 90° saw and the chamfer saw motor is moveable from a retracted position to a cutting position. The chamfer saw frame is mounted so that it is directly in the position which the 90° saw occupies when the 90° saw blade is in its cutting position. A chamfer saw is mounted on a shaft of the chamfer motor and when the chamfer saw motor is moved into a cutting position, the chamfer saw will cut a chamfer at a 45° angle with respect to the kerf, thereby forming a smooth chamfer.

BRIEF DESCRIPTION OF THE DRAWINGS

FIG. 4 is an end view partly in cross-section of the assembly of FIG. 1.

DESCRIPTION OF THE PREFERRED EMBODIMENTS

Figure 1:
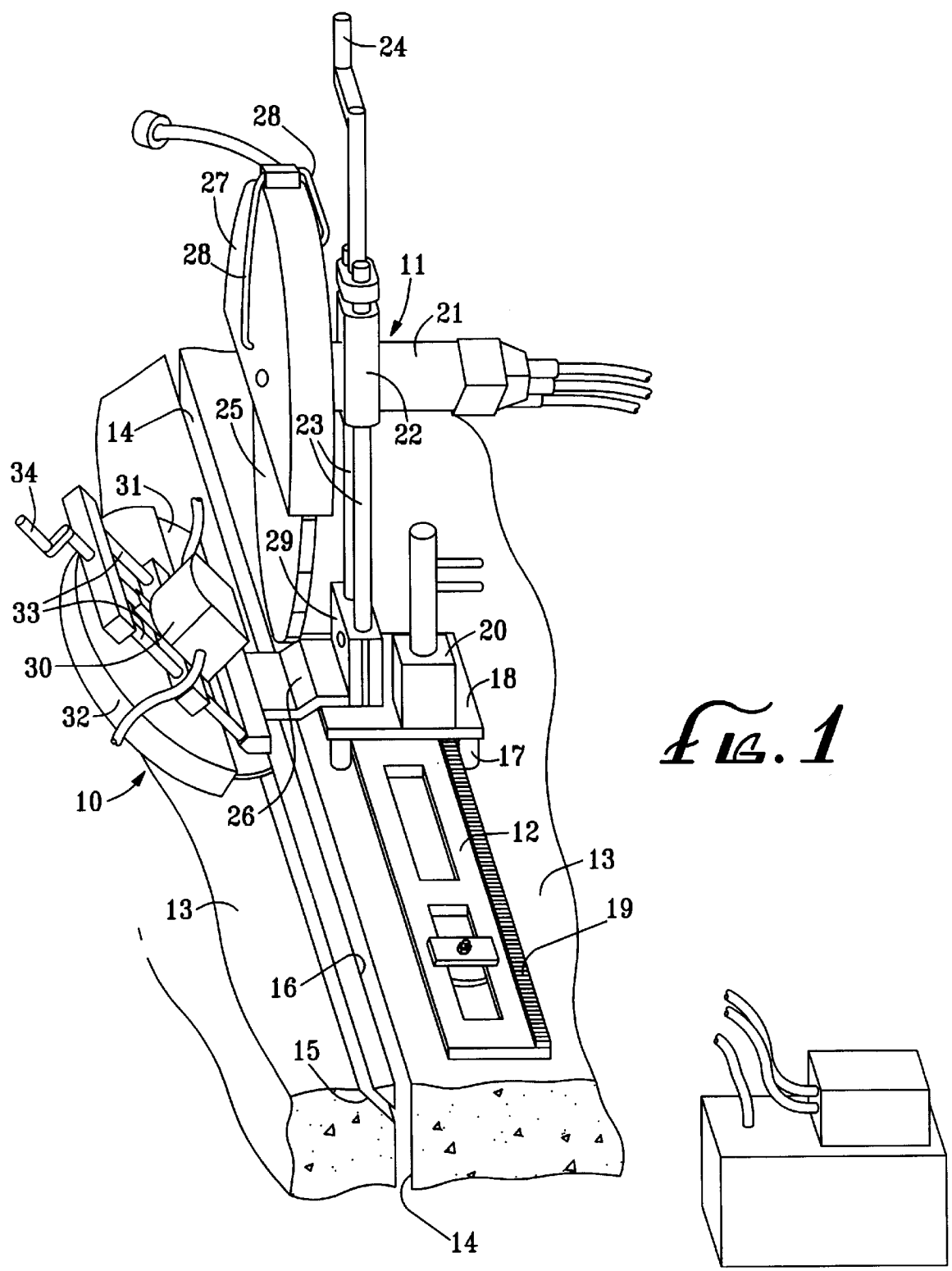
FIG. 1 is a perspective view showing the 90° saw assembly affixed to a track attached to a concrete wall in the position of cutting a chamfer along one edge of a 90° saw kerf.

An assembly for cutting a chamfer along one edge of a 90° saw kerf in a concrete wall is shown in perspective view in FIG. 1. The apparatus includes a chamfer saw assembly 10, a 90° saw assembly 11, and a track 12 affixed to a wall 13. A 90° saw kerf 14 is formed through wall 13 and a 45° chamfer cut 15 is formed along one corner 16 of kerf 14.

The 90° saw assembly 11 has a trolley 17 which supports a frame 18 along track 12. Wall 13 is vertical and the track is either vertically mounted or horizontally mounted on the outer surface of the wall. Track 13 has a rack 19 and a gear (not shown) driven by hydraulic motor 20 which move trolley 17 slowly up the vertically mounted track 12.

A vertical kerf 14 has already been formed. The part of the wall 13 to which track 12 is affixed is to be removed after all of the cuts have been formed. Typically, the cuts are not completely through the wall at the corners and, thus, the wall opening portion of the wall is strong enough to support the saw for all three or four cuts, depending on whether it is a door or a window.

The 90° saw assembly has a motor 21 which is shown as a hydraulic motor but may be electrically or air driven. The motor 13 is mounted on a moveable frame 22 which is supported on a pair of rods 23 and is vertically moved up and down by the turning of crank 24 in a conventional manner. Motor 21 is shown in a completely raised position so that the 90° blade 25 is completely above the frame 26 of chamfer saw assembly 10. The 90° saw 11 also has a conventional saw guard 27 which is fitted with a pair of water hose fittings 28 which are also conventional.

Returning now to the chamfer saw assembly 10, frame 26 is affixed by a clamp 29 to rods 23. A chamfer saw motor 30 is mounted at a 45° angle with respect to 90° saw blade 25. Saw motor is also a hydraulic motor, but, likewise, could be driven by other conventional means such as electricity or air. Saw motor 30 supports a chamfer saw blade 31. Saw blade 31 is also partly covered by a blade guard 32. Chamfer saw motor 30 is also movably mounted so that it may be raised from a cutting position and lowered into a cutting position. It is mounted on rods 33 and is moved up and down by turning crank 34.

Frame 36 is mounted onto frame 18 after the forming of kerf 14 and after motor 21 and saw blade 25 have been lifted to provide room for the mounting of frame 26. Then, the hydraulic hoses are affixed to motor 30 and to hydraulic motor 20 and motor 30 is started. Next, crank 34 is moved so that the moving saw begins to cut the 45° chamfer cut 15. Then, the hydraulic oil is passed through hydraulic motor 20 beginning the movement of the saw upwardly along the track 12.

Figure 2:
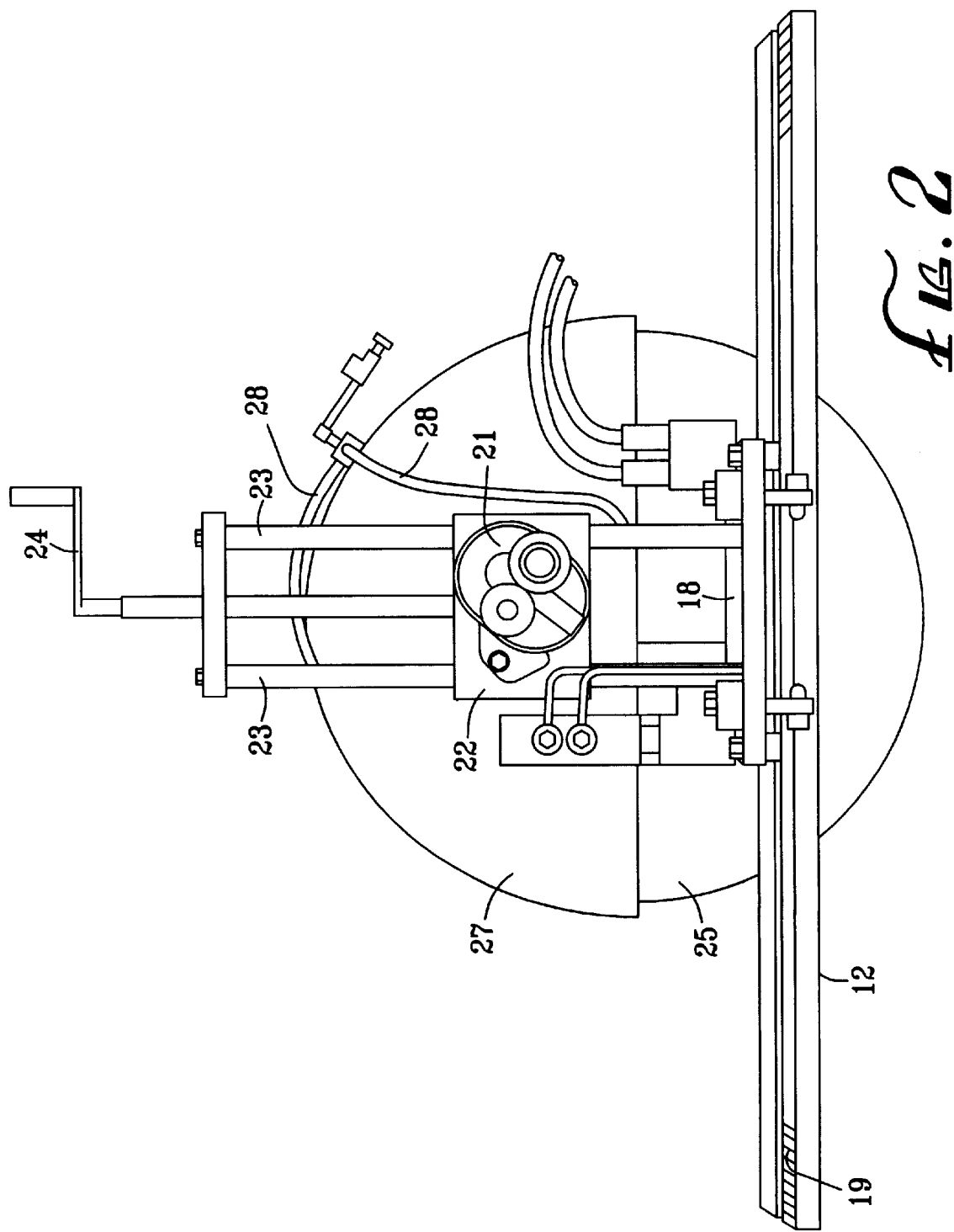
FIG. 2 is a back view of the 90° saw portion of FIG. 1.

The construction of 90° saw assembly 11 and track 12 is shown best in FIG. 2 of the drawings where the rods 23 and the operation of crank 24 are clearly visible. It can be seen in FIG. 2 that the motor 21 can be lifted sufficiently so that the saw blade 25 is above the frame 18 to permit the attachment of the chamfer saw to rods 23. The chamfer saw frame may, of course, also be mounted to frame 18 for those saws having no vertical rods 23. The important feature is that the chamfer saw blade 31 cuts at the same position in the center of frame 18 as the 90° saw blade does, or at least very close to this point, so that the chamfer cut can be made the same distance as the 90° kerf 14.

Figure 3:
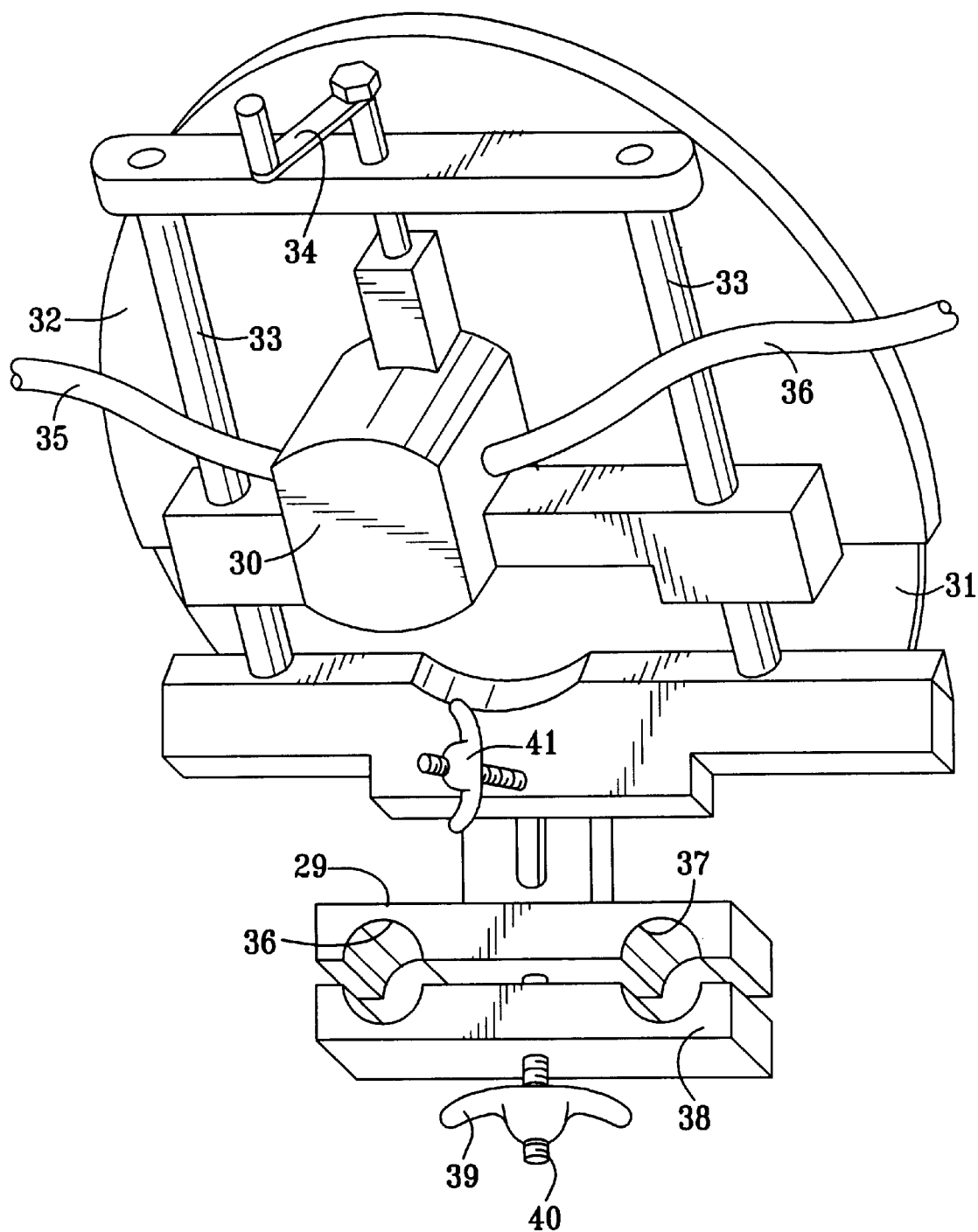
FIG. 3 is an enlarged perspective view of the chamfer saw shown in FIG. 1.

The chamfer saw itself is shown best in FIG. 3 where the saw motor 30 can be seen to have two hydraulic lines 35 and 36 affixed thereto to drive the motor 30. The clamp 29 has a pair of semi-circular receiving slots and a moveable piece 38 is tightened by the turning of thumb screw 39 on threaded shaft 40. While this type of clamp is shown in FIG. 3, any conventional clamp or attachment means can be used. As stated above, the chamfer frame may alternatively be simply bolted to the 90° saw frame or otherwise affixed thereto. The particular style of clamping is not unique, but should be configured to be readily attached to the 90° saw frame depending upon its configuration.

A second adjustment screw 41 permits the positioning of the chamfer saw blade 31 at an appropriate distance, depending upon the size of chamfer desired.

The 90° saw and chamfer saw assembly are shown in end view in partial cross-section in FIG. 4. The chamfer saw blade 31 passes just into kerf 14 and not into the door or window portion 42 of wall 13. The hydraulic fittings 43 and 44 of hydraulic motor 20 are also shown best in FIG. 4. These drive a gear which meshes with rack 19 as described above.

The result of using the chamfer saw of the present invention is to eliminate the time consuming and messy grinding of the chamfer adjacent kerf 14. Instead of a somewhat haphazard kerf formed either by a hand saw or by grinding, an exact 45° cut at a predetermined position is formed along the length of kerf to provide a far more attractive chamfer. Furthermore, the forming of the chamfer is quickly and easily done without having to reattach the track since the track does not have to be moved between the forming of the 90° cut and the 45° cut. In fact, it is beneficial that it not be moved so that the positioning of the chamfer can be accurately set with respect to the 90° cut. Although the angle referred to in the present application has been referred to as a 45° angle, it is, of course, understood that this angle can vary from 45° by supporting the saw at any desired angle to form a chamfer cut, which, although typically 45°, can, of course, be any desired chamfer angle.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for cutting a chamfer along an edge of a cut formed at 90° from a concrete wall surface using a wall saw assembly of the type including a track affixed to the concrete wall surface, said track guiding a trolley supporting a saw frame which holds a concrete saw motor and a 90° blade which saw frame also holds a driven gear which meshes with a rack held by the track to move the trolley along the track, said process comprising:

forming a cut through said concrete wall at a 90° angle with respect to said concrete wall surface along one side of a desired opening;

moving the 90° blade so that it is above the wall surface;

attaching a chamfer saw assembly to said frame, said chamfer saw assembly including a chamfer frame, a chamfer saw motor and a chamfer saw blade positioned at a desired chamfer angle with respect to said concrete wall surface and positioning the chamfer saw blade above the outer surface of the wall;

turning on the chamfer saw motor to rotate the chamfer saw blade and moving the motor and blade in a chamfer saw blade plane into the concrete adjacent the 90° cut; and moving the saw frame along said track to cut a chamfer in the wall surface adjacent the 90° cut.

2. The process of claim 1 wherein a portion of said chamfer frame is attached directly between the 90° saw blade and wall surface.

\* \* \* \* \*